US012692129B2

(12) United States Patent
Herkel

(10) Patent No.: US 12,692,129 B2
(45) Date of Patent: Jul. 28, 2026

(54) ELEVATOR SYSTEMS

(71) Applicant: Otis Elevator Company, Farmington, CT (US)

(72) Inventor: Peter Herkel, Berlin (DE)

(73) Assignee: OTIS ELEVATOR COMPANY, Farmington, CT (US)

(*) Notice: Subject to any disclaimer, the term of this patent is extended or adjusted under 35 U.S.C. 154(b) by 1653 days.

(21) Appl. No.: 16/951,078

(22) Filed: Nov. 18, 2020

(65) Prior Publication Data

US 2021/0403289 A1 Dec. 30, 2021

(30) Foreign Application Priority Data

Jun. 26, 2020 (EP) .................................... 20182705

(51) Int. Cl.
*B66B 13/22* (2006.01)
*B66B 13/14* (2006.01)

(52) U.S. Cl.
CPC ............ *B66B 13/22* (2013.01); *B66B 13/143* (2013.01)

(58) Field of Classification Search
CPC ..... B66B 13/22; B66B 13/143; B66B 5/0031; B66B 13/14; B66B 5/0018
See application file for complete search history.

(56) References Cited

U.S. PATENT DOCUMENTS 6,193,019 B1 2/2001 Sirigu et al.
11,390,487 B2 * 7/2022 Tracey .................... B66B 13/12
2019/0300337 A1 10/2019 Lindegger
2020/0324999 A1 * 10/2020 Stripling ................. B66B 5/025
2021/0101781 A1 * 4/2021 Roussel ................ B66B 5/0031
2023/0109720 A1 * 4/2023 Roussel ................ B66B 1/3461
187/325

FOREIGN PATENT DOCUMENTS

CN 101214897 A 7/2008
DE 102012005541 A1 9/2013
EP 2789563 A1 * 10/2014 ............. B66B 13/22
ES 2350219 A1 1/2011

OTHER PUBLICATIONS

European Search Report for Application No. 20182705.2; Issud Jan. 11, 2021; 8 Pages.

* cited by examiner

*Primary Examiner* — Jeffrey Donels
(74) *Attorney, Agent, or Firm* — CANTOR COLBURN LLP

(57) ABSTRACT

An elevator system is provided which includes a plurality of hoistway doors, a corresponding plurality of sets of non-contact switches, each set arranged to detect when a respective hoistway door is open, and a monitoring device. Each set of non-contact switches comprises a first non-contact switch arranged to open when the respective hoistway door is open and a second non-contact switch arranged to open when the respective hoistway door is open. The first non-contact switches of the plurality of sets are connected in series to form a first electrical path and the second non-contact switches of the plurality of sets are connected in series to form a second electrical path. The monitoring device is arranged to measure an electrical property of the first electrical path and an electrical property of the second electrical path to detect when a hoistway door is open.

14 Claims, 7 Drawing Sheets

ELEVATOR SYSTEMS

FOREIGN PRIORITY

This application claims priority to European Patent Application No. 20182705.2, filed Jun. 26, 2020, and all the benefits accruing therefrom under 35 U.S.C. § 119, the contents of which in its entirety are herein incorporated by reference.

TECHNICAL FIELD

The present disclosure relates to elevator systems that utilise non-contact switches to detect open hoistway doors.

BACKGROUND

A typical elevator system includes at least one elevator car running in a vertical hoistway between floors of a building. Hoistway doors on each floor open to allow access to the elevator car when it is stopped at that floor, but are otherwise kept closed for safety reasons (i.e. to prevent a user accessing the hoistway). Each hoistway door is typically fitted with a safety switch and movement of the elevator car is automatically prevented if any of the safety switches indicate that a hoistway door is open. Conventional safety switches comprise a pair of electrical contacts coupled directly to the hoistway doors and through which an electrical signal is passed. When a door is open, the contacts are physically separated and the electrical signal is interrupted, which is detected by a monitoring device connected to the electrical contacts. This is often by way of a "safety chain" in which all switches are connected in series such that if any one switch is opened, the safety chain is broken (i.e. no electrical current can flow along it). The use of electrical contacts coupled directly to the hoistway doors is reliable and inherently fail-safe. However, electrical contacts can become worn or dirty over time and thus require regular maintenance to mitigate the occurrence of false open-door detections.

The use of multiple redundant non-contact switches that are less prone to wear has been proposed as an alternative to electrical contacts. In such arrangements, each non-contact switch is monitored individually to ensure reliability and provide a lot of useful diagnostic information. However, the wiring and monitoring hardware required to implement this is complex.

SUMMARY

According to a first aspect of the present disclosure there is provided an elevator system comprising: a plurality of hoistway doors; a corresponding plurality of sets of non-contact switches, each set arranged to detect when a respective hoistway door is open; and a monitoring device; wherein: each set of non-contact switches comprises a first non-contact switch arranged to open when the respective hoistway door is open and a second non-contact switch arranged to open when the respective hoistway door is open; the first non-contact switches of the plurality of sets are connected in series to form a first electrical path and the second non-contact switches of the plurality of sets are connected in series to form a second electrical path; and the monitoring device is arranged to measure an electrical property of the first electrical path and an electrical property of the second electrical path to detect when a hoistway door is open.

According to a second aspect of the present disclosure there is provided a method of operating an elevator system, the elevator system comprising: a plurality of hoistway doors; and a corresponding plurality of sets of non-contact switches, each set arranged to detect when a respective hoistway door is open; wherein: each set of non-contact switches comprises a first non-contact switch arranged to open when the respective hoistway door is open and a second non-contact switch arranged to open when the respective hoistway door is open; and the first non-contact switches of the plurality of sets are connected in series to form a first electrical path and the second non-contact switches of the plurality of sets are connected in series to form a second electrical path; wherein the method comprises: measuring an electrical property of the first electrical path and an electrical property of the second electrical path to detect when a hoistway door is open.

Thus, it will be recognised by those skilled in the art that open hoistway doors in the elevator system of the present disclosure can be readily and reliably detected. The first and second non-contact switches of each set provide redundant monitoring of the state of each hoistway door, which means that an open hoistway door can reliably be detected without needing to use conventional electrical contacts. Furthermore, the monitoring device needs only to monitor two electrical paths to detect when any individual non-contact switch (and thus any hoistway door) is open, reducing complexity compared to existing solutions.

For example, if any of the first non-contact switches opens, the electrical property (e.g. an impedance) of the first electrical path will change (e.g. the impedance will increase), and this change is detected by the monitoring device as an indication that a hoistway door is open. Similarly, if any of the second non-contact switches opens, the electrical property of the second electrical path will change and be detected by the monitoring device. Thus even if one of the non-contact switches of a set fails (e.g. the first non-contact switch), the opening of another non-contact switch of the set (e.g. the second non-contact switch) will still be detected, thus providing redundancy. In some examples the monitoring device may be arranged to detect when a discrepancy between the first and second non-contact switches of a set of non-contact switches occurs (e.g. when one non-contact switch of a set is open but the other is closed), which may indicate that one of the non-contact switches of the set is faulty and needs to be repaired or replaced. The monitoring device may be arranged to detect a discrepancy between the first electrical path and the second electrical path. When all switches are functioning correctly, the opening of a hoistway door should cause both the first non-contact switch and the second non-contact switch of the corresponding set to open such that electrical properties of both the first electrical path and the second electrical path are changed (e.g. broken). Any discrepancy can then be treated as an indication of a faulty switch.

The monitoring device may be arranged to measure a direct current (DC) electrical property and/or an alternating current (AC) electrical property of the first and/or second electrical path. For instance, the monitoring device may be arranged to measure at least one of an impedance, frequency response or pulse delay of the first and/or second electrical paths. In the case of impedance, this may be a pure resistance, pure capacitance, pure inductance or a complex impedance resulting from any combination of these. The monitoring device may be arranged to measure a resistance of the first and/or second electrical path by applying a DC electrical signal with a known voltage to the first and/or second electrical paths and measuring the magnitude of current flowing through the first and/or second electrical path as a result, allowing the determination of the resistance using Ohm's law.

In some examples, it may be satisfactory simply to be able to detect whenever at least one hoistway door is open, i.e. without necessarily knowing if more than one hoistway door is open, or which particular hoistway door is open, because this can still facilitate basic safety protocols such as automatic prevention of elevator car operation whenever any hoistway door is open. In some examples, the elevator system is arranged to prevent operation (i.e. movement) of the elevator car if the monitoring device detects that a hoistway door is open.

However, it may be desirable in some circumstances to determine more information about the number of open hoistway doors and/or which specific hoistway doors are open. In some examples, therefore, the elevator system may comprise one or more bypass impedances connected in parallel with one or more of the first or second non-contact switches. In such cases, the bypass impedance(s) allows current to flow in the rest of the electrical path even when the non-contact switch to which it is connected in parallel is open (albeit with a different impedance due to the bypass impedance). This means that the opening of another non-contact switch in the electrical path can still be detected by the monitoring device (because there is still a flow of current in the electrical path which could be affected by the opening of another non-contact switch), increasing the amount of information the monitoring device is able to gather about the state of the hoistway doors.

One or more of the bypass impedances may comprise one or more resistors, capacitors or inductors. In some examples, one or more of the bypass impedances comprises one or more electronic components (e.g. resistors, capacitors or inductors) connected in series and/or in parallel, i.e. to create a filter circuit. The elevator system may comprise a first bypass impedance connected in parallel with each respective first non-contact switch and/or a second bypass impedance connected in parallel with each respective second non-contact switch.

Two or more first and/or second bypass impedances may be different, e.g., to facilitate some identification of which switch is open, or at least to establish a group of switches to which the open switch belongs (e.g. corresponding to hoistway doors of an upper or lower group of floors, floors above or below the current position of an elevator car). For instance, the elevator system may comprise different bypass impedances for each set of non-contact switches (i.e. for each hoistway door), to enable individual open hoistway doors to be identified. For instance, each first bypass impedance and/or each second bypass impedance may be different. The first and/or second impedances may be selected such that each unique combination of open and closed hoistway doors corresponds to a unique impedance of the first and/or second electrical paths, to allow the monitoring device to identify from impedance measurements the state of each hoistway door.

In some examples the elevator system comprises a first bypass resistor connected in parallel with each respective first non-contact switch and/or a second bypass resistor connected in parallel with each respective second non-contact switch. In other words, each set of non-contact switches may comprise a first bypass resistor connected in parallel with the first non-contact switch and/or a second bypass resistor connected in parallel with the second non-contact switch. This means that every first and/or second non-contact switch that is open increases the resistance of the first and/or second electrical path by an amount substantially equal to the resistance of the corresponding first and/or second bypass resistor (notwithstanding minor variations due to any inherent resistance in the conductors forming and connecting the switches). The monitoring device can thus distinguish between different numbers of non-contact switches (and thus different numbers of hoistway doors) being open. Each first and/or second bypass resistor may have the same resistance, such that the resistance of the first and/or second electrical path increases substantially linearly with the number of first and/or second non-contact switches that are open.

In some examples, the resistances of two or more first and/or second bypass resistors may be different. For instance, the elevator system may comprise first bypass resistors with a first resistance connected in parallel with the first non-contact switches of the sets corresponding to an upper group of hoistway doors, and first bypass resistors with a second resistance connected in parallel with first non-contact switches of the sets corresponding to a lower group of hoistway doors. Thus, by measuring the magnitude of a resistance increase of the first electrical path, the monitoring device can establish whether the open switch responsible for the increase corresponds to a hoistway door in the upper group or lower group. It will be appreciated that this concept can readily be extended to any number of groups.

Preferably, the resistances of the first and/or second bypass resistors are selected such that each unique combination of open and closed hoistway doors corresponds to a unique resistance of the first and/or second electrical paths, to allow the monitoring device to identify from resistance measurements the state of each hoistway door. The resistances of the first and/or second bypass resistors may be selected according to $R=R_0^N$, where $R_0$ is a starting resistance and N is different for each floor or for each resistor. For example, resistances may be selected by repeatedly doubling a starting resistance (e.g. that corresponds to (or is greater than) a measurement resolution of the monitoring device), to ensure that every possible combination of resistances is unique. For example, the resistances of the first and/or second bypass resistors may be selected from the list starting 1 kΩ, 2 kΩ, 4 kΩ, 8 kΩ, etc. It will be appreciated that these particular values are only used by way of example and illustration. Other values and other schemes for generating unique resistance combinations may also be used. The resistances of the first and/or second bypass resistors may be selected such that each unique combination of open and closed non-contact switches corresponds to a unique resistance of the first and/or second electrical paths.

As mentioned above, one or more of the bypass impedances may comprise one or more electronic components connected in series and/or in parallel to create a filter circuit (e.g. comprising an L, RL, RC, LC or RLC circuit). In some examples the elevator system comprises a first and/or second bypass resistor in series with one or more inductors, and/or in parallel with one or more inductors or capacitors, to create respective first and/or second filter circuits. Each set of non-contact switches may comprise a unique filter circuit (i.e. with unique filter characteristics). The electronic components of each filter circuit may be selected such that each unique combination of open and closed hoistway doors (or each unique combination of open and closed non-contact switches) corresponds to a unique AC electrical property (e.g. impedance (including resistance and/or capacitance and/or inductance), pulse delay or frequency response) of the first and/or second electrical paths.

In some examples, the monitoring device may be arranged to measure an AC electrical property of the first and/or second electrical path, for example an impedance, a frequency response or a pulse delay. For example, the monitoring device may be arranged to measure the time it takes (i.e. the delay) for a short electrical pulse to propagate through the first and/or second electrical paths or the monitoring device may send different frequency waveforms to determine which are filtered out. The monitoring device may additionally or alternatively be arranged to measure a delay for a change in waveform and/or frequency of an AC signal to propagate through the first and/or second electrical paths.

In some examples the monitoring device is arranged to measure a first electrical property of the first and/or second electrical paths when operated in a first mode (e.g. a passive detection mode), and to measure a second electrical property of the first and/or second electrical paths when operated in a second mode (e.g. an active localisation mode). For instance, the monitoring device may be arranged to measure a DC electrical property (e.g. a resistance) of the first and/or second electrical paths in the first mode (e.g. by applying a fixed DC voltage and measuring current flow). In the first mode, a change in resistance (e.g. including a change to infinite resistance or open circuit) measured by the monitoring device may be indicative of an open hoistway door but may not be suitable for identifying which specific non-contact switch or hoistway door is open. However, in the second mode the monitoring device may be arranged to measure an AC electrical property (e.g. an impedance, a frequency response or a pulse delay) of the first and/or second electrical paths. This may allow for accurate identification of the specific non-contact switch or hoistway that is open. The monitoring device may be arranged to switch from operating in the first mode to operating in the second mode upon detection of an open hoistway door and/or upon detection of a discrepancy between the first electrical path and the second electrical path.

In some examples, the method of operating the elevator system comprises measuring a DC electrical property of the first and/or second electrical paths at a first time, and measuring an AC electrical property of the first and/or second electrical paths to detect and identify an open hoistway door at a second time. In some examples, the method comprises switching from measuring a DC electrical property of the first and/or second electrical paths to measuring an AC electrical property of the first and/or second electrical paths upon detection of an open hoistway door.

While the above description has been given in respect of a first mode measuring a DC property and a second mode measuring an AC property, it will be appreciated that it is also possible for the monitoring device to measure a DC electrical property in both the first mode and the second mode. It is also possible for the monitoring device to measure an AC electrical property in both the first mode and the second mode. Finally, it is also possible for the monitoring device to measure an AC electrical property in the first mode and a DC electrical property in the second mode.

The first and second non-contact switches may comprise any suitable non-contact switch (i.e. a switch that does not rely on mechanical contact to change state). For example the non-contact switches could be light sensors or infrared sensors. In other examples the non-contact switches could be magnetic switches. In some examples, at least one of the first and second non-contact switches comprises a reed switch. Additionally or alternatively, in some examples at least one of the first and/or second non-contact switches may comprise a radar sensor or an inductive sensor.

According to a third aspect, there is provided an alternative configuration of non-contact switches that achieves many of the same advantages as those described with reference to the first aspect. According to this third aspect of the present disclosure there is provided an elevator system comprising: a plurality of hoistway doors and a corresponding plurality of sets of non-contact switches, each set arranged to detect when a respective hoistway door is open; and a monitoring device; wherein each set of non-contact switches comprises: a first non-contact switch arranged to open when the respective hoistway door is open; a first impedance connected in series with the first non-contact switch; a second non-contact switch arranged to open when the respective hoistway door is open; and a second impedance connected in series with the second non-contact switch; wherein the first non-contact switch and the first impedance are connected in parallel with the second non-contact switch and the second impedance; wherein the sets of non-contact switches are connected in series to form an electrical path; and wherein the monitoring device is arranged to measure an electrical property of the electrical path to detect when a hoistway door is open.

According to a fourth aspect of the present disclosure there is provided a method of operating an elevator system, the elevator system comprising: a plurality of hoistway doors; and a corresponding plurality of sets of non-contact switches, each set arranged to detect when a respective hoistway door is open; wherein each set of non-contact switches comprises: a first non-contact switch arranged to open when the respective hoistway door is open; a first impedance connected in series with the first non-contact switch; a second non-contact switch arranged to open when the respective hoistway door is open; and a second impedance connected in series with the second non-contact switch; wherein the first non-contact switch and the first impedance are connected in parallel with the second non-contact switch and the second impedance; wherein the sets of non-contact switches are connected in series to form an electrical path; and wherein the method comprises: measuring an electrical property of the electrical path to detect when a hoistway door is open.

Thus it will be understood by those skilled in that art that in examples according to the third and fourth aspects of the present disclosure, if any of the first or second non-contact switches opens, the electrical property of the electrical path will change, allowing the open switch to be detected by the monitoring device. For example, the first and second impedances may comprise resistors, and the monitoring device may be arranged to measure the DC resistance of the electrical path, which increases if any of the first or second non-contact switches is open. Similarly to examples according to the first and second aspects of the disclosure, the first and second non-contact switches of each set provide redundant monitoring of the state of each hoistway door, which means that an open hoistway door can reliably be detected without needing to use conventional electrical contacts. In addition, the monitoring device needs to monitor only a single electrical path to detect when any individual non-contact switch (and thus any hoistway door) is open, even further reducing complexity. In some examples the monitoring device may be arranged to detect when a discrepancy between the first and second non-contact switches of a set of non-contact switches occurs.

The first and/or second impedance may comprise one or more resistors, capacitors or inductors. In some examples, the first and/or second impedances may comprise a plurality of electronic components (e.g. resistors, capacitors or inductors) connected in series and/or in parallel.

The monitoring device may be arranged to measure a DC electrical property and/or an AC electrical property of the electrical path. For instance, the monitoring device may be arranged to measure at least one of an impedance (including resistance, capacitance, inductance or any combination thereof), frequency response or pulse delay of the electrical path. The monitoring device may be arranged to measure a resistance of the electrical path by applying a DC electrical signal with a known voltage to the electrical path and measuring the magnitude of current flowing through the electrical path as a result, allowing the determination of the resistance using Ohm's law.

In some examples, the elevator system may comprise one or more bypass impedances connected in parallel with the first and/or second non-contact switches. In such cases, the bypass impedance(s) allows current to flow in the rest of the electrical path even when the first and second non-contact switches to which it is connected in parallel are open (albeit with a different impedance). This means that the opening of another non-contact switch in the electrical path can still be detected by the monitoring device. In some examples each set of non-contact switches comprises a bypass impedance connected in parallel with the first and second non-contact switches.

One or more of the bypass impedances may comprise one or more resistors, capacitors or inductors. In some examples, one or more of the bypass impedances comprises one or more electronic components (e.g. resistors, capacitors or inductors) connected in series and/or in parallel, e.g. to create a filter circuit.

It will be appreciated that the electrical properties (e.g. resistance, impedance, etc.) of the electrical path are determined by which of the first and second non-contact switches are open as well as the first and second impedances, along with any bypass impedances or other electrical components. In some examples, two or more first and/or second impedances are different. The first and second impedances may be selected to facilitate some identification of which switch is open, or at least to establish a group of switches to which the open switch belongs. For instance, the system may comprise upper and lower groups of hoistway doors (i.e. corresponding to upper and lower groups of floors), and in such examples the first and second impedances connected in series with the first and second non-contact switches of the sets corresponding to the upper group of hoistway doors may be different to the first and second impedances connected in series with the first and second non-contact switches of the sets corresponding to the lower group of hoistway doors. Thus, by measuring the impedance of the electrical path, the monitoring device may be able to establish whether a hoistway door is open, and whether the open door is in the upper group or the lower group. It will be appreciated that this concept can readily be extended to any number of groups.

In some examples, first and second impedances (and optionally, in relevant examples, any bypass impedances) may be different for each set of non-contact switches (i.e. for each hoistway door), to enable individual open hoistway doors to be identified. For example, each first impedance may be different and/or each second impedance may be different.

Preferably, the first and second impedances are selected such that each unique combination of open and closed hoistway doors corresponds to a unique impedance of the electrical path, to allow the monitoring device to identify from a single impedance measurement the state of each hoistway door. For instance, the first and second impedances may comprise respective first and second resistors, whose resistance is selected according to $R=R_0^N$, where $R_0$ is a starting resistance and N is different for each floor or for each resistor. For example, different resistances may be selected by repeatedly doubling a starting resistance (e.g. that corresponds to (or is greater than) a measurement resolution of the monitoring device), to ensure that every possible combination of resistances is unique. The resistances of the first and second resistors may be between approximately 1Ω and 1000Ω.

The first and second impedances may be selected such that each unique combination of open and closed non-contact switches corresponds to a unique impedance of the electrical path, e.g., to allow for the identification of individual faulty switches. Of course, in some examples, it may not be necessary for every combination of open and closed non-contact switches to correspond to a unique impedance. It may, for instance, suffice to identify a group of switches or doors to which the faulty switch or open door belongs.

As mentioned above, one or more of the bypass impedances may comprise one or more electronic components connected in series and/or in parallel to create a filter circuit (e.g. comprising an L, RL, RC, LC or RLC circuit). In some examples, the elevator system may comprise a bypass resistor in series with one or more inductors, and/or in parallel with one or more inductors or capacitors to create a filter circuit. Each set of non-contact switches may comprise a unique filter circuit (i.e. with unique filter characteristics). The b electronic components of each filter circuit may be selected such that each unique combination of open and closed hoistway doors (or unique combination of open and closed non-contact switches) corresponds to a unique AC electrical property (e.g. impedance (including resistance and/or capacitance and/or inductance), pulse delay and/or frequency response) of the electrical path.

In some examples, the monitoring device may be arranged to measure an AC electrical property of the electrical path, for example an impedance, a frequency response or a pulse delay. For example, the monitoring device may be arranged to measure the time it takes (i.e. the delay) for a short electrical pulse to propagate through the electrical path. The monitoring device may additionally or alternatively be arranged to measure a delay for a change in waveform and/or frequency of an AC signal to propagate through the first and/or second electrical paths.

In some examples the monitoring device may be arranged to measure a first electrical property of the electrical path in a first mode (e.g. a passive detection mode), and to measure a second electrical property of the electrical path in a second mode (e.g. an active localisation mode). For instance, the monitoring device may be arranged to measure a DC electrical property (e.g. a resistance) of the electrical path in the first mode (e.g. by applying a fixed DC voltage and measuring current flow). In the first mode, a change in resistance measured by the monitoring device may be indicative of an open hoistway door but may not be suitable for identifying which specific non-contact switch or hoistway door is open. However, in the second mode the monitoring device may be arranged to measure an AC electrical property (e.g. an impedance, a frequency response or a pulse delay) of the electrical path. This may allow for accurate identification of the specific non-contact switch or hoistway door that is open. The monitoring device may be arranged to switch from the first mode to the second mode upon detection of an open hoistway door.

In some examples, the method of operating the elevator system comprises measuring a DC electrical property of the electrical path at a first time, and measuring an AC electrical property of the electrical path to detect and identify an open hoistway door at a second time. In some examples, the method comprises switching from measuring a DC electrical property of the electrical path to measuring an AC electrical property of the electrical path upon detection of an open hoistway door. As discussed above, the use of DC for both modes/times or AC for both modes/times or AC for the first mode/time and DC for the second mode/time are also possible.

The first and second non-contact switches may comprise any suitable non-contact switch (i.e. a switch that does not rely on mechanical contact to change state). For example the non-contact switches could be light sensors or infrared sensors. In other examples the non-contact switches could be magnetic switches. In some examples, at least one of the first and second non-contact switches comprises a reed switch. Additionally or alternatively, in some examples at least one of the first and/or second non-contact switches may comprise a radar sensor or an inductive sensor.

It is believed that the use of AC monitoring to identify an open non-contact switch is independently inventive and so from a fifth aspect of the present disclosure there is provided an elevator system comprising: a plurality of hoistway doors and a corresponding plurality of sets of non-contact switches, each set arranged to detect when a respective hoistway door is open; and a monitoring device; wherein: each set of non-contact switches comprises at least one non-contact switch, and at least one further electronic component connected in parallel with the non-contact switch so that each set of non-contact switches comprises a unique AC electrical property; the sets of non-contact switches are connected in series to form an electrical path; and the monitoring device is arranged to measure an AC electrical property of the electrical path to detect and identify an open hoistway door.

From a sixth aspect of the present disclosure there is provided a method of operating an elevator system comprising: a plurality of hoistway doors and a corresponding plurality of sets of non-contact switches, each set arranged to detect when a respective hoistway door is open; and wherein: each set of non-contact switches comprises at least one non-contact switch, and at least one further electronic component connected in parallel with the non-contact switch so that each set of non-contact switches comprises a unique AC electrical property; the sets of non-contact switches are connected in series to form an electrical path; and the method comprises: measuring an AC electrical property of the electrical path to detect and identify an open hoistway door.

The sets of non-contact switches in examples according to the fifth and sixth aspects could of course be arranged and in accordance with any of the examples of the earlier aspects.

In a set of examples, the method comprises measuring a DC electrical property of the electrical path. In some examples, the method comprises measuring a DC electrical property of the electrical path to detect an open hoistway door at a first time (e.g. when a monitoring device is operating in a first mode), and measuring an AC electrical property of the electrical path to detect and identify an open hoistway door at a second time (e.g. when a monitoring device is operating in a second mode). In some examples the method comprises switching from measuring a DC electrical property of the electrical path to measuring an AC electrical property of the electrical path upon detection of an open hoistway door. As discussed above, the use of DC for both modes/times or AC for both modes/times or AC for the first mode/time and DC for the second mode/time are also possible.

Furthermore, in general, features of any aspect or example described herein may, wherever appropriate, be applied to any other aspect or example described herein. Where reference is made to different examples, it should be understood that these are not necessarily distinct but may overlap.

DRAWING DESCRIPTION

One or more non-limiting examples will now be described, by way of example only, and with reference to the accompanying figures in which.

DETAILED DESCRIPTION

Figure 1:
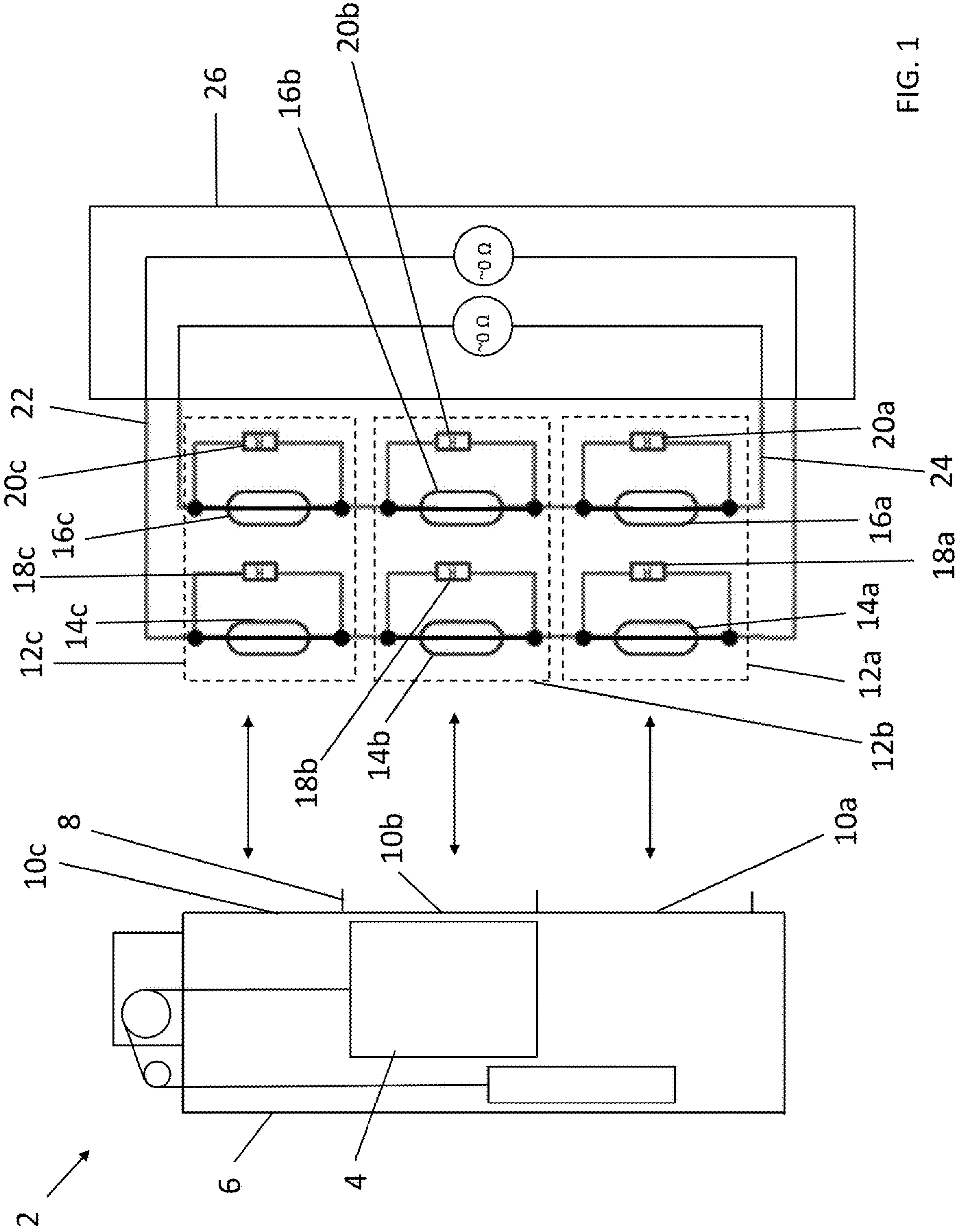
FIGS. 1-3 are schematic views of an elevator system according to an example of the present disclosure.

FIG. 1 shows an elevator system 2 comprising an elevator car 4 that is driven to move in a hoistway 6 between a plurality of landings 8. Hoistway doors 10*a*, 10*b*, 10*c* on each landing 8 open to provide access to the elevator car 4 but otherwise remain closed to prevent unsafe access to the hoistway 6.

To ensure safe operation of the elevator system 2, the state (i.e. open or closed) of each hoistway door 10*a*, 10*b*, 10*c* is monitored, to prevent potentially unsafe operation of the elevator car 4 whilst any of the hoistway doors 10*a*, 10*b*, 10*c* is open. The elevator system 2 therefore comprises a plurality of sets of non-contact switches 12*a*, 12*b*, 12*c*, each set arranged to monitor the state of a respective hoistway door 10*a*, 10*b*, 10*c*. Each set of non-contact switches 12*a*, 12*b*, 12*c* comprises a first non-contact switch 14*a*, 14*b*, 14*c* and a second non-contact switch 16*a*, 16*b*, 16*c* (e.g. reed switches). Each set 12*a*, 12*b*, 12*c* also comprises a first bypass resistor 18*a*, 18*b*, 18*c* connected in parallel with the first switch 14*a*, 14*b*, 14*c*, and a second bypass resistor 20*a*, 20*b*, 20*c* connected in parallel with the second non-contact switch 16*a*, 16*b*, 16*c*.

In the example shown in FIG. 1, all of the first non-contact switches 14*a*, 14*b*, 14*c* are connected in series to form a first electrical path 22, and all of the second non-contact switches 16*a*, 16*b*, 16*c* are connected in series to form a second electrical path 24. The first and second electrical paths 22, 24 are connected to a monitoring device 26. The monitoring device 26 is arranged to measure an electrical property of each of the first and second electrical paths 22, 24. In this example, the monitoring device 26 is arranged to measure the resistance. This allows the monitoring device 26 to detect when any one of the first and second non-contact switches 14*a*, 14*b*, 14*c*, 16*a*, 16*b*, 16*c* is open, because when any of the first and second non-contact switches is open, the resistance of the corresponding electrical path 22, 24 increases (because the current must then travel through the corresponding first or second bypass resistor 18*a*, 18*b*, 18*c*, 20*a*, 20*b*, 20*c*).

Furthermore, the resistances of the first and second bypass resistors 18*a*, 18*b*, 18*c*, 20*a*, 20*b*, 20*c* are selected to enable the monitoring device 26 to determine which particular hoistway doors is open. For example, the first and second bypass resistors 18*c*, 20*c* associated with the upper hoistway door 10*c* have a resistance of 1 kΩ, the first and second bypass resistors 18*b*, 20*b* associated with the middle hoistway door 10*b* have a resistance of 2 kΩ and the first and second bypass resistors 18*c*, 20*c* associated with the lower hoistway door 10*c* have a resistance of 4 kΩ. The monitoring device 26 may thus use the measured resistance of the first or second electrical paths 22, 24 to determine which of the switches 14*a*, 14*b*, 14*c*, 16*a*, 16*b*, 16*c* (and thus which corresponding hoistway door(s) 10*a*, 10*b*,10*c*) is open according to the following table, presuming a baseline resistance (with all switches closed) of approximately 0Ω:

| Resistance measurement | Open hoistway door |
|---|---|
| ~0 Ω | None |
| 1 kΩ | Upper (10c) |
| 2 kΩ | Middle (10b) |
| 3 kΩ | Upper (10c) and middle (10b) |
| 4 kΩ | Lower (10a) |
| 5 kΩ | Upper (10c) and lower (10a) |
| 6 kΩ | Upper (10c) and middle (10a) |
| 7 kΩ | All |

Figure 2:
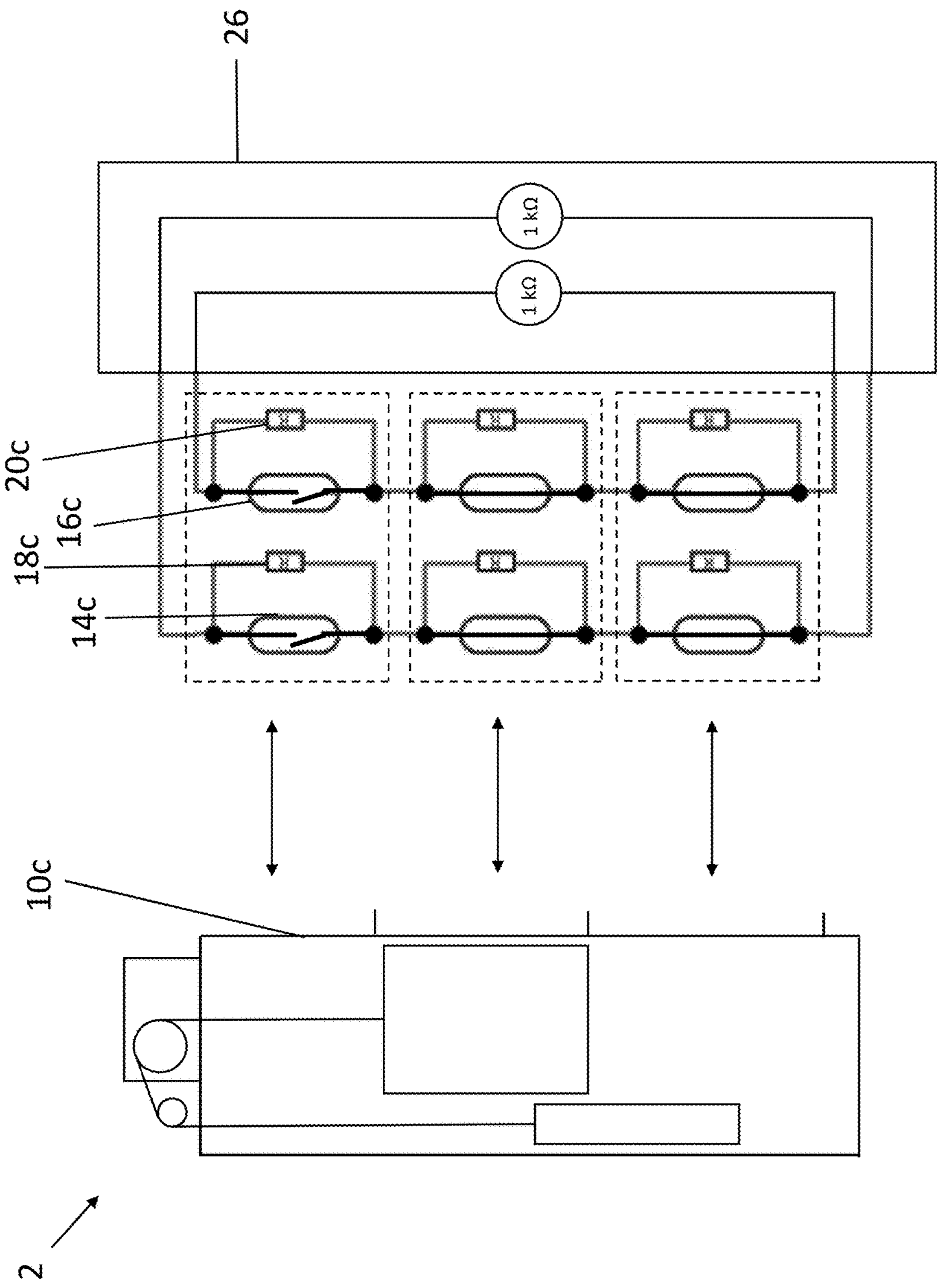

For example, in the scenario illustrated in FIG. 2, the upper hoistway door 10*c* is open (e.g. due to the elevator car having stopped at the landing 8 to allow passengers on/off, or for any other reason such as a fault or a mechanical failure). The first and second non-contact switches 14*c*, 16*c* of the corresponding set of non-contact switches 12*c* both open as they are designed to do. As a result, the resistances of the first and second electrical paths 22, 24 both increase to ~1 kΩ. This is measured by the monitoring device 26 which consequently determines that the upper hoistway door 10*c* is open and automatically halts operation of the elevator car 4.

Figure 3:
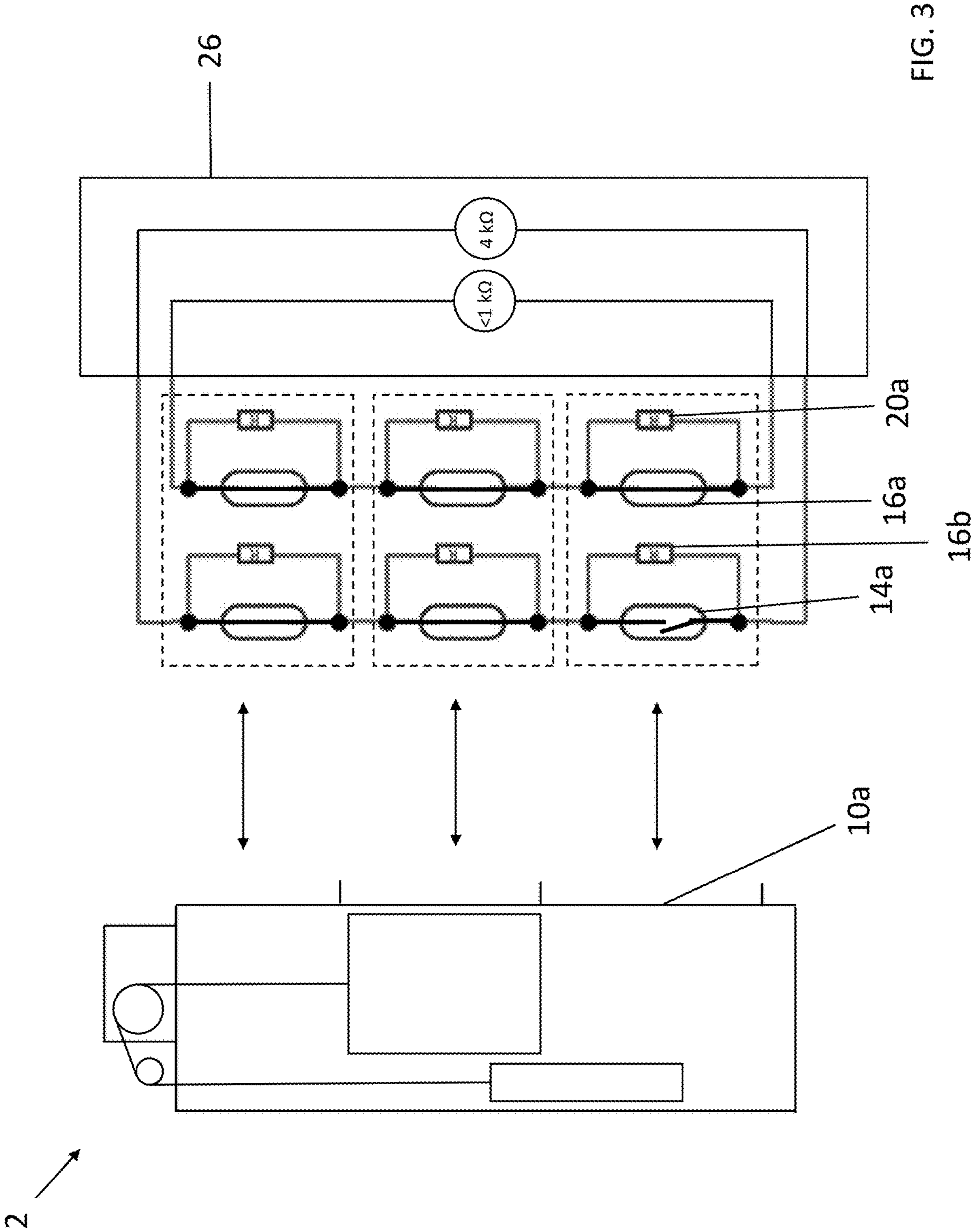

In the scenario illustrated in FIG. 3, the lower hoistway door 10*a* is open, but only the first non-contact switch 14*a* of the corresponding set 12*a* properly detects this and opens. The second non-contact switch 16*a* remains closed (e.g. due to a fault with the non-contact switch 16*a*). The monitoring device 26 measures the resistance of the first electrical path 22 to be 4 kΩ, but the resistance of the second electrical path 24 remains at ~0Ω. The monitoring device 26 determines that the lower hoistway door 10*a* is open and automatically halts operation of the elevator car 4 based on detection of the open switch 14*a*, but also detects and reports that the second non-contact switch 16*a* may be faulty.

In another example which is not illustrated, the first and second non-contact switches 14*a*, 14*b*, 14*c*, 16*a*, 16*b*, 16*c* are laid out as shown in FIG. 1 and connected to the monitoring device 26 in the same manner, but the first and second bypass resistors 18*a*, 18*b*, 18*c*, 20*a*, 20*b*, 20*c* are omitted. This simpler embodiment still provides the redundancy of the first non-contact switch 14*a* and the second non-contact switch 16*a* in each set, with the diagnostic capability to determine a faulty switch, and with the simplicity of only two electrical paths for the monitoring device 26 to monitor, but does not provide the more detailed diagnostics of which door or switch may be open.

Figure 4:
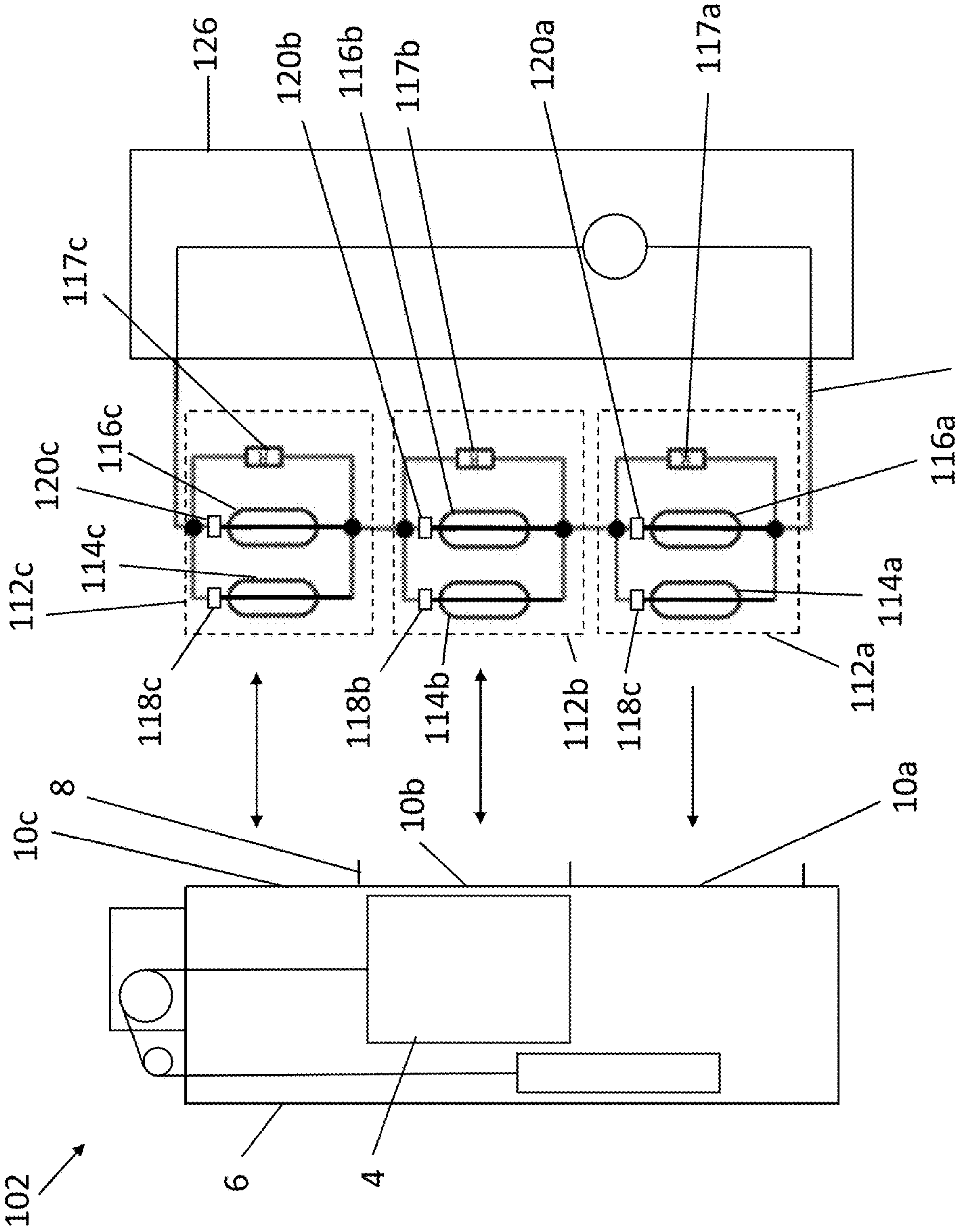
FIG. 4-5 is a schematic view of an elevator system according to another example of the present disclosure.

FIG. 4 shows another elevator system 102 comprising an elevator car 4 that is driven to move in a hoistway 6 between a plurality of landings 8. Hoistway doors 10*a*, 10*b*, 10*c* on each landing 8 open to provide access to the elevator car 4 but otherwise remain closed to prevent unsafe access to the hoistway 6. As with the example illustrated in FIGS. 1-3, the elevator system 102 comprises a plurality of sets of non-contact switches 112*a*, 112*b*, 112*c*, each set arranged to monitor the state of a respective hoistway door 10*a*, 10*b*, 10*c*. Each set of non-contact switches 112*a*, 112*b*, 112*c* comprises a first non-contact switch 114*a*, 114*b*, 114*c*, a second non-contact switch 116*a*, 116*b*, 116*c* and a bypass resistor 117*a*, 117*b*, 117*c*, all connected in parallel.

In this example, each first non-contact switch 114*a*, 114*b*, 114*c* is connected in series with a first resistor 118*a*, 118*b*, 118*c* and each second non-contact switch 116*a*, 116*b*, 116*c* is connected in series with a second resistor 120*a*, 120*b*, 120*c*. The sets of non-contact switches 112*a*, 112*b*, 112*c* are connected in series to form an electrical path 122. A monitoring device 126 is arranged to measure an electrical property of the electrical path 122 (in this example, a resistance of the electrical path 122). The monitoring device 126 is thus able to detect when any one of the first and second non-contact switches 114*a*, 114*b*, 114*c*, 116*a*, 116*b*, 116*c* opens by measuring the corresponding increase in the resistance of the electrical path 122. As each set 112*a*, 112*b*, 112*c* comprises three resistors in parallel (e.g. the first resistor 118*a*, the second resistor 120*a* and the bypass resistor 117*a* of the first set 112*a*), the opening of either switch (e.g. the first non-contact switch 114*a* or second non-contact switch 116*a*) will remove one resistor from the parallel arrangement, thereby increasing the overall resistance of the set (e.g. 112*a*).

Furthermore, the resistances of the first and second resistors 118*a*, 118*b*, 118*c*, 120*a*, 120*b*, 120*c* and the bypass resistors 117*a*, 117*b*, 117*c* are selected to enable the monitoring device 126 to determine which particular hoistway door 10*a*, 10*b*, 10*c* is open—i.e. such that each combination of open and closed hoistway doors 10*a*, 10*b*, 10*c* corresponds to a unique resistance of the electrical path 122.

Figure 5:
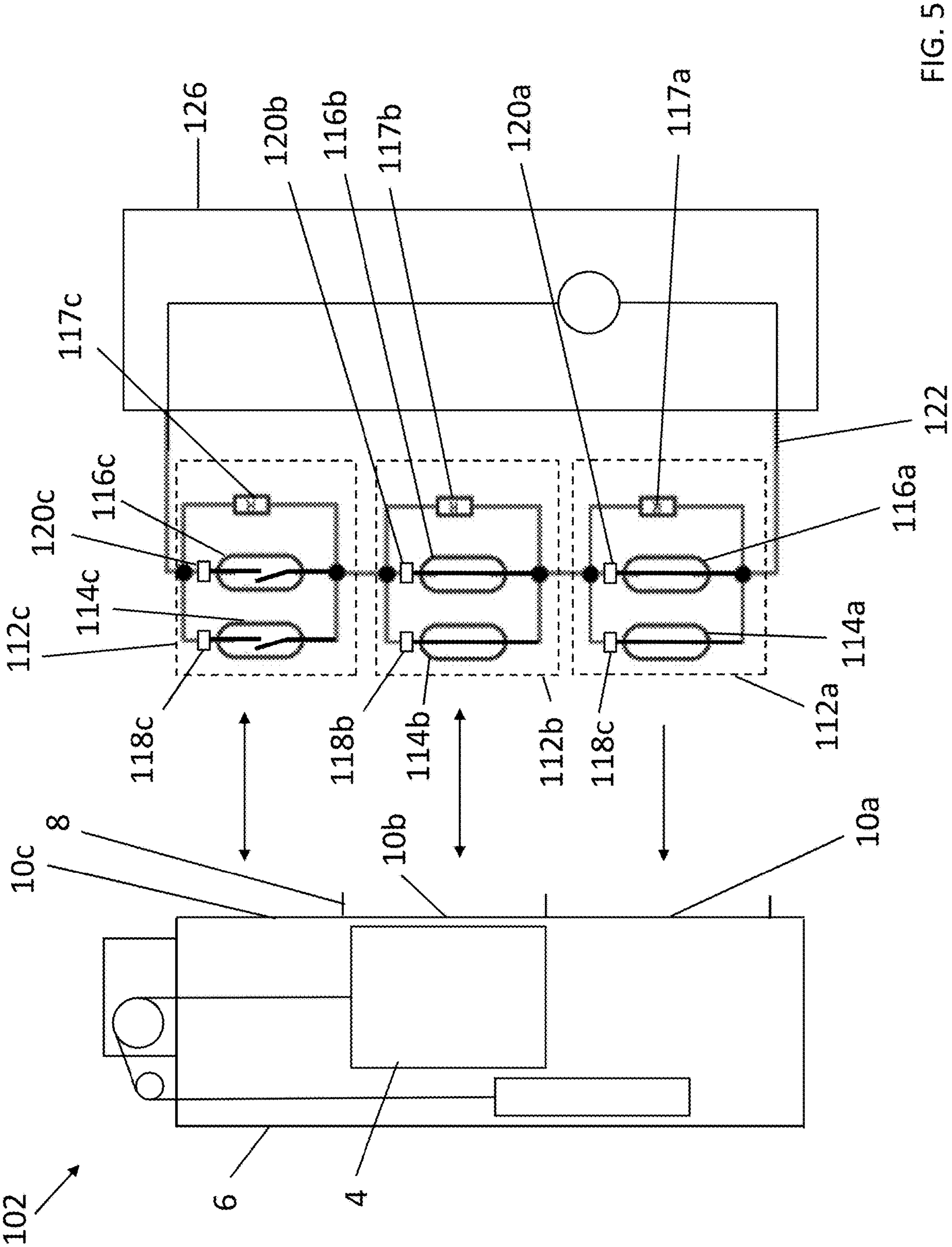

In use, the monitoring device 126 measures the resistance of the electrical path 122. As shown in FIG. 5, when the upper hoistway door 10*c* opens, the corresponding first and second non-contact switches 114*c*, 116*c* open and the resistance of the electrical path 122 changes accordingly. The monitoring device 126 thus detects that a door being open and, by measuring the resistance of the electrical path 122, identifies that it is the upper hoistway door 10*c* that is open.

Because the first and second non-contact switches 114*c*, 116*c* are connected in series with first and second resistors 118*c*, 120*c*, even if one of the non-contact switches 114*c*, 116*c* is faulty (i.e. it does not open when the hoistway door 10*c* opens), the resistance of the path 122 will still change. The monitoring device 126 can thus detect that a door is open despite the fault (even if it cannot identify which particular door is open).

In some examples, the resistances of the first and second resistors 118*a*, 118*b*, 118*c*, 120*a*, 120*b*, 120*c* and the bypass resistors 117*a*, 117*b*, 117*c* are chosen such that each combination of open and closed non-contact switches 114*a*, 114*b*, 114*c*, 116*a*, 116*b*, 116*c* corresponds to a unique resistance of the electrical path 122. This enables the monitoring device 126 to detect and identify a specific open door even if one of the non-contact switches corresponding to that door is faulty. This may also allow the monitoring device 126 to identify faulty non-contact switches.

Figure 6:
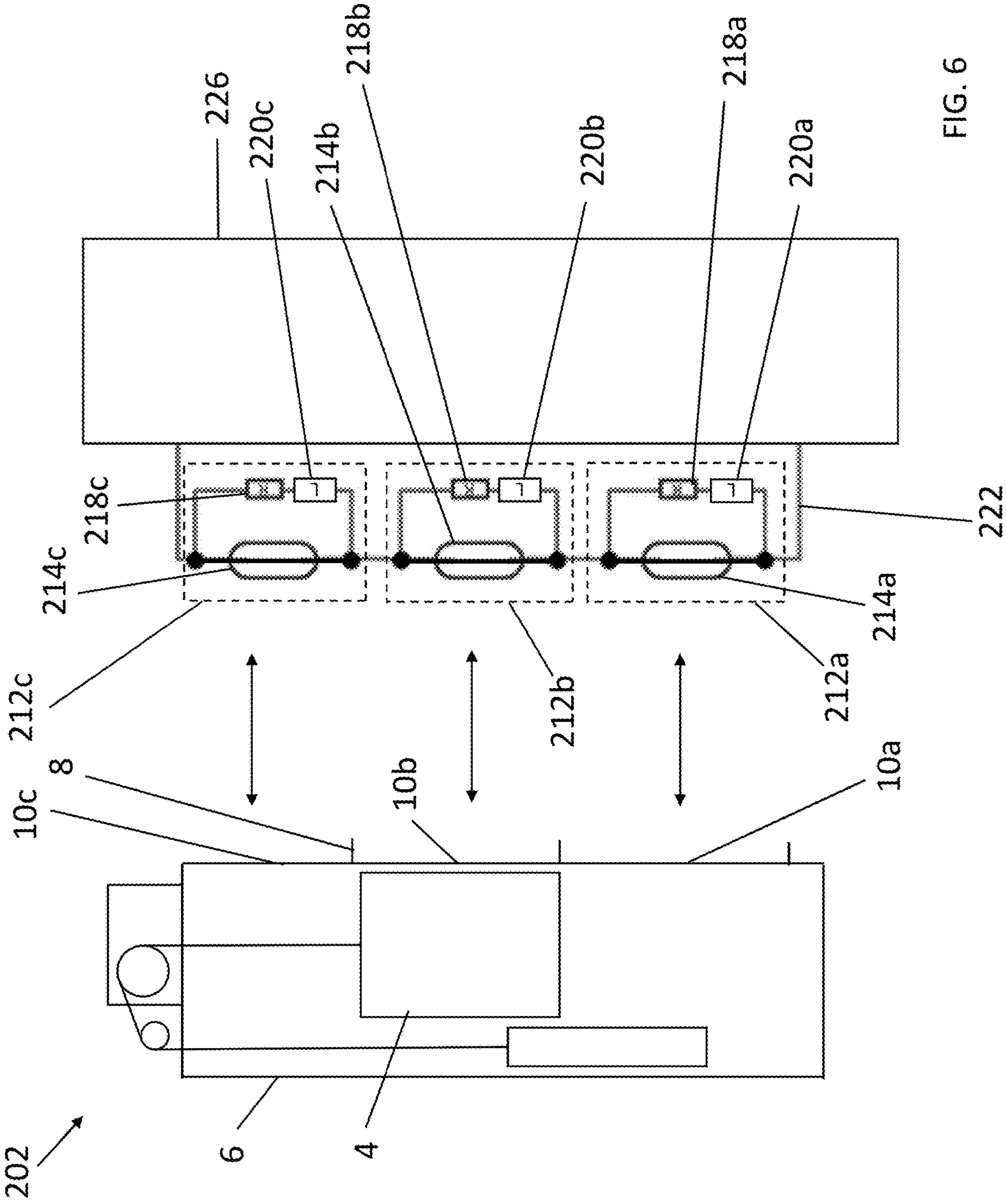
FIG. 6 is a schematic view of an elevator system according to another example of the present disclosure.

FIG. 6 shows another elevator system 202 which uses AC monitoring to detect and identify open hoistway doors.

The elevator system 202 comprises an elevator car 4 that is driven to move in a hoistway 6 between a plurality of landings 8. Hoistway doors 10*a*, 10*b*, 10*c* on each landing 8 open to provide access to the elevator car 4 but otherwise remain closed to prevent unsafe access to the hoistway 6. As with the examples illustrated in FIGS. 1-5, the elevator system 202 comprises a plurality of sets of non-contact switches 212*a*, 212*b*, 212*c*, each set arranged to monitor the state of a respective hoistway door 10*a*, 10*b*, 10*c*.

Each set of non-contact switches 212*a*, 212*b*, 212*c* comprises a non-contact switch 214*a*, 214*b*, 214*c* and a bypass filter circuit connected in parallel with the non-contact switch 214*a*, 214*b*, 214*c*. Each bypass filter circuit comprises a resistor 218*a*, 218*b*, 218*c* and an inductor 220*a*, 220*b*, 220*c* connected in series. In other examples (not illustrated) a bypass filter circuit may comprise a single inductor, a resistor connected in parallel with an inductor or a capacitor, or any other combination of resistors, inductors and/or capacitors (or other components) suitable for providing a set of non-contact switches with a unique AC electrical property.

All of the non-contact switches 214*a*, 214*b*, 214*c* are connected in series to form an electrical path 222, which is connected to a monitoring device 226. The monitoring device 226 is arranged to measure an AC electrical property of the electrical path 222. In this example, the monitoring device 226 is arranged to measure the time it takes for a short electrical pulse to propagate through the electrical path 222 (i.e. the pulse delay time). This allows the monitoring device 226 to detect when any one of the non-contact switches 214*a*, 214*b*, 214*c* is open, because when any of the non-contact switches 214*a*, 214*b*, 214*c* is open the impedance of the electrical path 222 (and thus the pulse delay time) changes.

The resistances of the resistors 218*a*, 218*b*, 218*c* and the inductances of the inductors 220*a*, 220*b*, 220*c* are selected such that each combination of open and closed doors corresponds to a unique pulse delay time. This allows the monitoring device 226 to detect and identify open doors 10*a*, 10*b*, 10*c* by measuring the pulse delay time of the electrical path 222.

In some examples, the monitoring device 226 has two modes of operation. The first mode is a passive detection mode in which the monitoring device 226 measures a DC resistance of the electrical path 222 (e.g. by applying a known voltage to the electrical path 222 and measuring current flow through the electrical path 222). The second mode is an active localization mode, in which the monitoring device 226 measures the pulse delay time of the electrical path 222 (e.g. measuring the time it takes for a short electrical pulse to propagate through the electrical path 222).

The monitoring device 226 normally operates in the passive detection mode. If any of the non-contact switches 214*a*, 214*b*, 214*c* opens (i.e. if the corresponding hoistway door 10*a*, 10*b*, 10*c* opens), the resistance of the electrical path changes (because current must now pass through the corresponding resistor 218*a*, 218*b*, 281*c* of the bypass filter circuit. This change is easily detected by the monitoring device 226. The monitoring device 226 may consume little power in the passive detection mode (e.g. by applying only a small voltage applied to the electrical path 222), but the accuracy with which the change in resistance can be measured is limited. Thus, when a change in resistance (i.e. an open door) is detected, the monitoring device 226 switches to the active localization mode, in which the open door can be quickly and accurately identified from the measured pulse delay time which depends on the value of the inductor corresponding to the open door.

Figure 8:
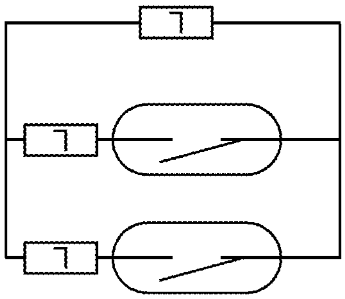
FIGS. 7 and 8 show alternative arrangements for impedances for use in the various examples.
Figure 7:
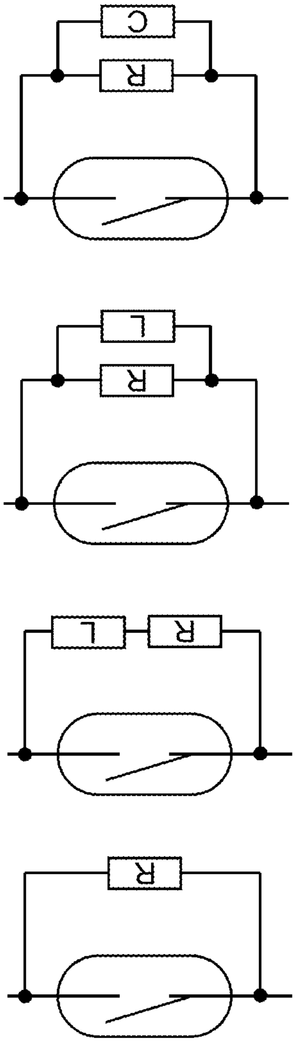

FIGS. 7 and 8 illustrate some alternative arrangements for impedances that can be used with the examples described above. The arrangements illustrated in FIG. 7 are particularly suited for use in the examples of FIGS. 1, 2, 3 and 6. The arrangements illustrated in FIG. 8 are particularly suited for use in the examples of FIGS. 4 and 5. It will however be appreciated that these examples are merely illustrative and are not limiting. Other arrangements are also possible.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. An elevator system (2) comprising:

a plurality of hoistway doors (10*a*, 10*b*, 10*c*);

a corresponding plurality of sets of non-contact switches (12*a*, 12*b*, 12*c*), each set arranged to detect when a respective hoistway door (10*a*, 10*b*, 10*c*) is open; and a monitoring device (26);

wherein:

each set of non-contact switches (12*a*, 12*b*, 12*c*) comprises a first non-contact switch (14*a*, 14*b*, 14*c*) arranged to open when the respective hoistway door (10*a*, 10*b*, 10*c*) is open and a second non-contact switch (16*a*, 16*b*, 16*c*) arranged to open when the respective hoistway door (10*a*, 10*b*, 10*c*) is open;

the first non-contact switches (14*a*, 14*b*, 14*c*) of the plurality of sets (12*a*, 12*b*, 12*c*) are connected in series to form a first electrical path (22) and the second non-contact switches (16*a*, 16*b*, 16*c*) of the plurality of sets (12*a*, 12*b*, 12*c*) are connected in series to form a second electrical path (24); and the monitoring device (26) is arranged to measure an electrical property of the first electrical path (22) and an electrical property of the second electrical path (24) to detect when a hoistway door (10*a*, 10*b*, 10*c*) is open;

wherein each set of non-contact switches further comprises a first bypass impedance (18*a*, 18*b*, 18*c*) connected in parallel with the first non-contact switch (14*a*, 14*b*, 14*c*) and/or a second bypass impedance (20*a*, 20*b*, 20*c*) connected in parallel with the second non-contact switch (16*a*, 16*b*, 16*c*).

2. The elevator system (2) as claimed in claim 1, wherein the monitoring device (26) is arranged to measure a resistance of the first and/or second electrical path (22, 24).

3. The elevator system (2) as claimed in claim 1, wherein the first and/or second bypass impedances (18*a*, 18*b*, 18*c*, 20*a*, 20*b*, 20*c*) are different.

4. The elevator system (2) as claimed in claim 3, wherein each first bypass impedance (18*a*, 18*b*, 18*c*) and/or each second bypass impedance (20*a*, 20*b*, 20*c*) is different, such that each unique combination of open and closed hoistway doors (10*a*, 10*b*, 10*c*) corresponds to a unique impedance of the first and/or second electrical paths (22, 24).

5. The elevator system (2) as claimed in claim 1, wherein the at least one first and/or second bypass impedance (18*a*, 18*b*, 18*c*, 20*a*, 20*b*, 20*c*) comprises a plurality of electronic components.

6. The elevator system (2) as claimed in claim 1, wherein the monitoring device (26) is arranged to measure a first electrical property of the first and/or second electrical path (22, 24) when operated in a first mode, and to measure a second electrical property of the first and/or second electrical path (22, 24) when operated in a second mode.

7. The elevator system (2) as claimed in claim 6, wherein the monitoring device (26) is arranged to switch from operating in the first mode to operating in the second mode upon detection of an open hoistway door.

8. An elevator system (102) comprising:

a plurality of hoistway doors (10*a*, 10*b*, 10*c*) and a corresponding plurality of sets of non-contact switches (112*a*, 112*b*, 112*c*), each set arranged to detect when a respective hoistway door (10*a*, 10*b*, 10*c*) is open; and a monitoring device (126);

wherein each set of non-contact switches (112*a*, 112*b*, 112*c*) comprises:

a first non-contact switch (114*a*, 114*b*, 114*c*) arranged to open when the respective hoistway door (10*a*, 10*b*, 10*c*) is open;

a first impedance (118*a*, 118*b*, 118*c*) connected in series with the first non-contact switch (114*a*, 114*b*, 114*c*);

a second non-contact switch (116*a*, 116*b*, 116*c*) arranged to open when the respective hoistway door (10*a*, 10*b*, 10*c*) is open; and a second impedance (120*a*, 120*b*, 120*c*) connected in series with the second non-contact switch (116*a*, 116*b*, 116*c*);

wherein the first non-contact switch (114*a*, 114*b*, 114*c*) and the first impedance (118*a*, 118*b*, 118*c*) are connected in parallel with the second non-contact switch (116*a*, 116*b*, 116*c*) and the second impedance (120*a*, 120*b*, 120*c*);

wherein the sets of non-contact switches (112*a*, 112*b*, 112*c*) are connected in series to form an electrical path (122); and wherein the monitoring device (126) is arranged to measure an electrical property of the electrical path (122) to detect when a hoistway door (10*a*, 10*b*, 10*c*) is open.

9. The elevator system (102) as claimed in claim 8, wherein the monitoring device (126) is arranged to measure a resistance of the electrical paths (122).

10. The elevator system (102) as claimed in claim 8, wherein two or more first and/or second impedances (118*a*, 118*b*, 118*c*, 120*a*, 120*b*, 120*c*) are different.

11. The elevator system (102) as claimed in claim 10, wherein each first impedance (118*a*, 118*b*, 118*c*) is different and/or each second impedance (120*a*, 120*b*, 120*c*) is different, such that each unique combination of open and closed hoistway doors corresponds to a unique impedance of the electrical path (122).

12. The elevator system (102) as claimed in claim 8, wherein each set of non-contact switches (112*a*, 112*b*, 112*c*) comprises a bypass impedance (117*a*, 117*b*, 117*c*) connected in parallel with the first and second non-contact switches (114*a*, 114*b*, 114*c*, 116*a*, 116*b*, 116*c*).

13. The elevator system (102) as claimed in claim 12, wherein at least one bypass impedance (117*a*, 117*b*, 117*c*) comprises a plurality of electronic components.

14. An elevator system (202) comprising:

a plurality of hoistway doors (10*a*, 10*b*, 10*c*) and a corresponding plurality of sets of non-contact switches (212*a*, 212*b*, 212*c*), each set arranged to detect when a respective hoistway door (10*a*, 10*b*, 10*c*) is open; and a monitoring device (226);

wherein:

each set of non-contact switches (212*a*, 212*b*, 212*c*) comprises at least one non-contact switch (214*a*, 214*b*, 214*c*), and at least one further electronic component (218*a*, 218*b*, 218*c*, 220*a*, 220*b*, 220*c*) connected in parallel with the non-contact switch (214*a*, 214*b*, 214*c*) so that each set of non-contact switches (212*a*, 212*b*, 212*c*) comprises a unique AC electrical property;

the sets of non-contact switches (212*a*, 212*b*, 212*c*) are connected in series to form an electrical path (222); and the monitoring device (226) is arranged to measure an AC electrical property of the electrical path (222) to detect and identify an open hoistway door (10*a*, 10*b*, 10*c*).

* * * * *